United States Patent

[11] 3,603,595

[72] Inventor Eiichi Wada
Yokohama-shi, Japan
[21] Appl. No. 802,892
[22] Filed Feb. 27, 1969
[45] Patented Sept. 7, 1971
[73] Assignee Mondo Kabrishiki Kaisha
Tokyo-to, Japan
[32] Priority Mar. 1, 1968
[33] Japan
[31] 43-13275

[54] MAGNETIC SOUND RECORDING AND REPRODUCING APPARATUS
2 Claims, 3 Drawing Figs.

[52] U.S. Cl. .......... 274/4 E, 179/100.2 Z, 242/200
[51] Int. Cl. .......... G11b 5/00
[50] Field of Search .......... 274/4 C, 4 E, 11 C; 242/197–200; 179/100.2 Z

[56] References Cited
UNITED STATES PATENTS

| | | | |
|---|---|---|---|
| 3,408,017 | 10/1968 | Hashimoto | 242/200 |
| 3,429,519 | 2/1969 | Staar | 274/4 E |
| 3,416,316 | 8/1964 | Knoth | 274/4 E |
| 3,494,572 | 2/1970 | Uemura | 242/198 |
| 3,495,835 | 2/1970 | Laa | 274/4 E |

*Primary Examiner*—Leonard Forman
*Assistant Examiner*—Dennis A. Dearing
*Attorney*—Waters, Roditi, Schwartz & Nissen ABSTRACT: In a tape recorder, a magnetic sound recording and reproducing head and pinch rollers are mounted on a plate member which is moved forwardly in response to the upward movement of an elevator frame including a driving means for upright reel driving shafts and capstans, and is moved rearwardly by a spring. The capstans and the head are moved forwardly in response to the upward movement of the elevator frame which is released by the loading of a cassette to clamp the tape between the pinch rollers and the capstans and the plate member is quickly moved rearwardly by means of an operating member for a fast forward and fast rewind and quick running mechanism to disengage the head and the pinch rollers away from the tape.

MAGNETIC SOUND RECORDING AND REPRODUCING APPARATUS

BACKGROUND OF THE INVENTION

This invention relates to improvements relating to tape cassette-type magnetic sound recording and reproducing apparatus commonly known as tape recorders.

In a tape cassette-type tape recorder, the so-called one-touch system is adopted wherein upon loading a cassette in a predetermined position the tape is clamped between capstans and pinch rollers to begin to run while at the same time a recording and reproducing head (hereinafter merely called a head) is brought to directly oppose and contact the tape.

In such an arrangement, it is desirable that the tape be correctly clamped between the capstans and pinch rollers and that the head be brought to contact the tape at the desired position. According to one prior arrangement proposed to meet these requirements, upon loading the cassette in a predetermined position, the capstan is raised along the side surface of the tape so as to clamp it against the pinch roller mounted at a predetermined position thus driving the tape. In an alternative arrangement, instead of raising the capstans the pinch rollers are raised to clamp and drive the tape.

With regard to the head there are two types, viz in one type when the cassette is loaded in the predetermined position, the tape which is exposed at the front surface of the cassette is brought into contact with the head which is mounted at a predetermined position whereas in the other types, like the capstan the head is also raised to engage the tape. However, with these prior mechanisms, even a small error of the operating timing may damage the tape. In addition, the mechanisms are complicated, and involve the possibility of faults.

SUMMARY OF THE INVENTION

It is therefore an object of this invention to provide a new and improved magnetic tape recorder which can obviate the above defects.

A more specific object of this invention is to provide an improved magnetic tape recorder of simple construction wherein the various component parts can be maintained at their accurate positions without damaging the tape.

Briefly stated, in accordance with this invention a tape recorder is provided wherein a magnetic sound recording and reproducing head and pinch rollers are mounted on a plate member which is moved forwardly in response to the upward movement of an elevator frame including a driving means for upright reel driving shafts and capstans, and is moved rearwardly under the bias of a spring means in a predetermined range, the capstans and the magnetic sound recording and reproducing head being moved forwardly in response to the upward movement of the elevator frame which is released by the loading of a cassette into a predetermined position to clamp the tape between the pinch rollers and the capstans and the plate member is quickly moved rearwardly by means of an operating member for a fast forward and fast rewind mechanism to disengage the head and the pinch rollers away from the tape. A latch member is provided to be actuated by the loaded capstan to permit upward movement of the elevator frame.

BRIEF DESCRIPTION OF THE DRAWING

The invention can be more fully understood from the following detailed description when taken in conjunction with the accompanying drawing in which.

DESCRIPTION OF THE PREFERRED EMBODIMENT

Figure 1:
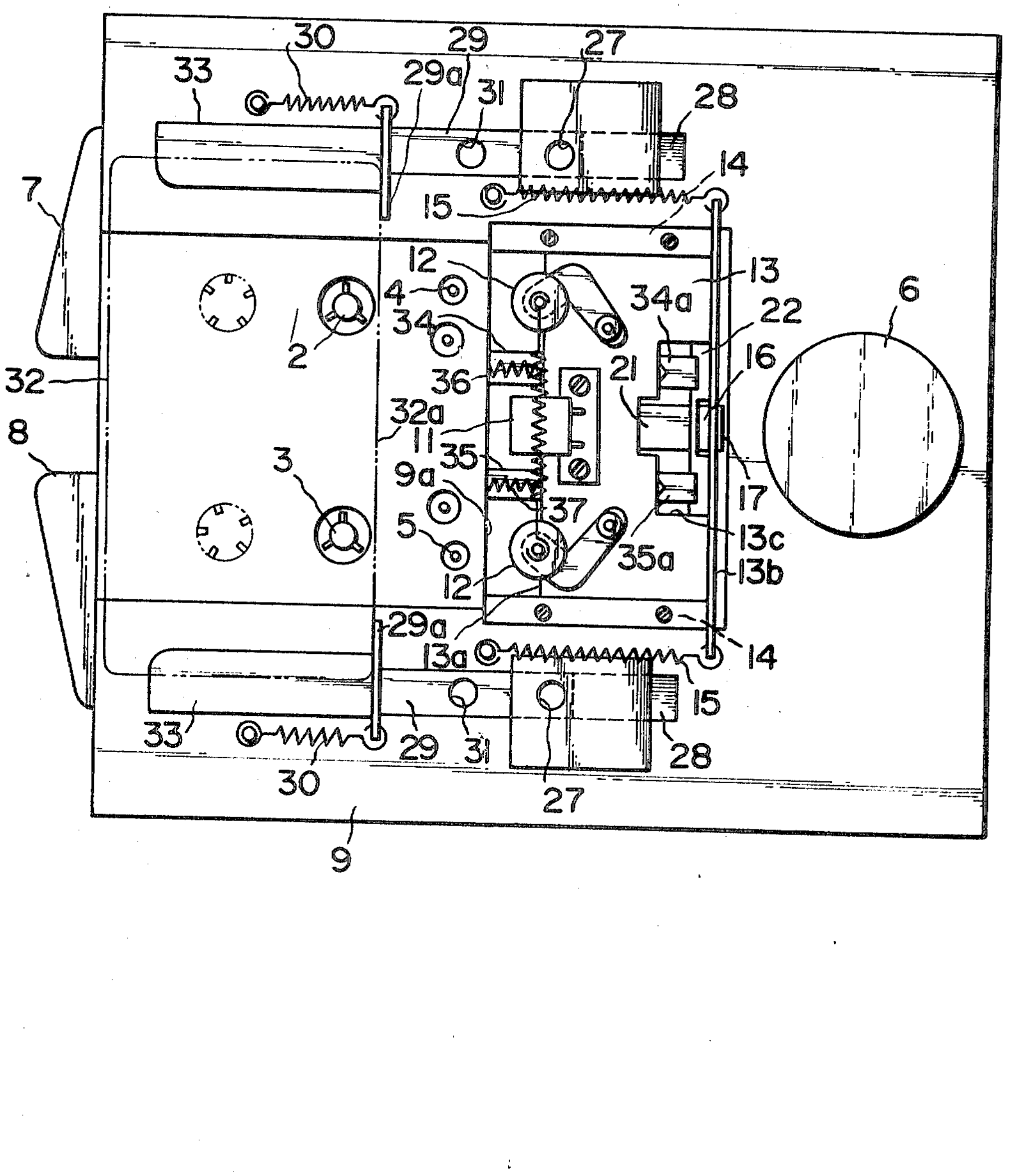
FIG. 1 shows a plan view of a magnetic tape recorder embodying this invention.

Referring now to the accompanying drawing, there is shown an elevator frame 1 comprising reel driving shafts 2 and 3, capstans 4 and 5 and a driving mechanism (not shown) adapted to reduce the speed of an electric motor 6 for driving upright reel driving shafts 2 and 3 and capstans 4 and 5 at predetermined speeds and to effect fast forward and fast rewind operations of the tape under the control of pushbuttons 7 and 8. The elevator frame 1 is guided for movement in the vertical direction by a pair of vertical shafts 10 (only one of them is shown in FIG. 2) secured to a stationary frame 9.

A plate member 13 carrying a magnetic recording and reproducing head 11 (hereinafter merely called a head) and a pair of spaced-apart pinch rollers 12 is disposed to move in the horizontal direction along guide grooves 14 provided in frame 9 for the plate member 13 and is normally biased forwardly under the action of springs 15 until its fore-end 13*a* abuts against an edge 9*a* of the stationary frame 9. The horizontal movement of the plate member 13 is controlled by the vertical movement of a lever 16 which engages the front surface of a bent up portion 13*b* at the rear end of the plate member. The bent up portion 13*b* is biased by a leaf spring 17 with its lower end secured to the lever 16 as best shown in FIG. 2.

Figure 2:
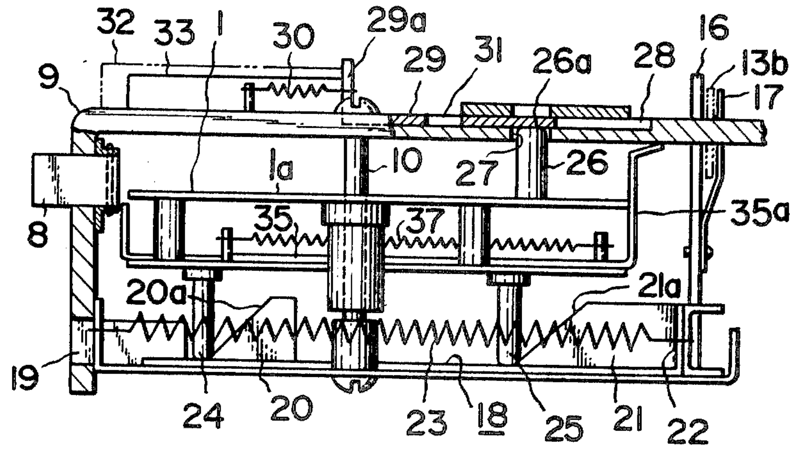
FIG. 2 is a side view, partly broken away, of a driving mechanism for an elevator frame.

As shown in FIG. 2, the lower end of lever 16 is secured to the rear end of a control member 18 for the elevator frame which is integral with a reset button 19. Thus, the lever 16 is moved in the horizontal direction together with the elevator frame control member 18.

The elevator frame control member 18 comprises blocks 20 and 21 secured thereto and formed with forwardly inclined surfaces 20*a* and 21*a*, respectively, and a frame work 22 which secures blocks 20 and 21. The control member 18 is normally biased in the forward direction by a pair of springs 23 (only one of them is shown in FIG. 2) camming pins 24 and 25 are secured to the bottom of the elevator frame 1 to cooperate with the inclined surfaces 20*a* and 21*a* of blocks 20 and 21 respectively.

A pair of stop pins 26 (only one of them is shown) is secured on the upper surface of the elevator frame 1, the upper ends 26*a* of pins 26 being normally received in openings 27 of the stationary frame 9. The upper ends of openings 27 are communicated with the bottom of guide grooves 28 and the upward movement of stop pins 26 is permitted only when openings 27 are aligned with openings 31 in latch members 29 when these members are moved along guide grooves 28 against the bias of springs 30.

The fore-end of each latch member 29 is bent upwardly to form an arm 29*a* adapted to engage fore-end 32*a* of a cassette 32. When arms 29*a* are brought to their foremost positions by being pulled by springs 30, the arms are stopped when they come to engage the front faces of cassette guides 33. Furthermore the assembly is constructed such that when openings 31 and 27 are aligned to permit upward movement of stop pins 26, the position of the front surface of arms 29 determines the position of the front surface 32*a* of the cassette 32 in the loaded condition.

Figure 3:
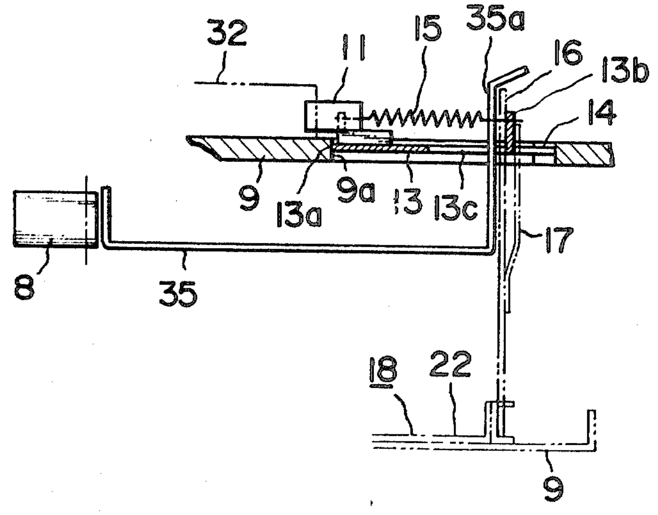
FIG. 3 is a side view, partly broken away, of a horizontal driving mechanism for a plate which supports a recording and reproducing head.

Fast forward and fast rewind operating arms 34 and 35 (in FIGS. 2 and 3 only arm 35 is shown) are slidably mounted on the elevator frame 1. The fore-end of these arms are bent up to come to oppose unwinding and quick buttons 7 and 8 when the elevator frame is raised. Bent up portions 34*a* and 35*a* formed on the rear ends of these operating arms 34 and 35 are raised upwardly through a notch 13*c* of the plate member 13 when the elevator frame 1 is raised to oppose bent up portion 13*b* of the plate member 13 so that when pushbuttons 7 and 8 are depressed these operating arms 34 and 35 are pushed rearwardly to actuate the fast forward and fast rewind mechanism. At the same time, the plate member 13 is retracted against the resilient force of plate spring 17.

Operating arms 34 and 35 are normally biased by tension springs 36 and 37 to abut against the upper plate 1*a* of the elevator frame 1.

The operation of the tape recorder constructed as above described is as follows: When a cassette 32 is inserted in the horizontal direction along cassette guides 33, the front end 32*a* of the cassette will force arms 29*a* of latch members 29 against the tension of springs 30 to move latch members 29 rearwardly. Then, at the time when openings 29 of the latch members 29 are brought into alignment with openings 27 of stationary frame 9 to permit upward movement of stop pins 26, the elevator frame 1 will be pushed upwardly by the action of elevator frame control member 18 under the strong tension of springs 23, while at the same time latch members 29 will be stopped at that position to cause raised reel driving shafts 2 and 3 to fit in openings (not shown) provided for cassette 32 for receiving them. Also, capstans 4 and 5 are projected through a notch (not shown) of cassette 32 to engage the rear side of the tape (not shown) contained in the cassette. Furthermore as lever 16 advances with the elevator frame control member 18, plate member 13 which has been arrested by lever 16 will now follow the same to advance in the horizontal direction to a predetermined position.

Advancement of plate member 13 to the predetermined position and stopping of cassette at the predetermined position brings head 11 and the tape in the cassette into engagement while at the same time pinch rollers 12 are advanced in the horizontal direction to resiliently clamp the tape between these rollers and capstans 4 and 5, thus commencing feeding of the tape.

To effect fast forward and fast rewind, either one of pushbuttons 7 and 8 is depressed to operate the fast forward and fast rewind mechanism contained in the elevator frame 1. At the same time, operating arm 34 or 35 is forced in the rearward direction so that either one or both of bent up portions 34*a* and 35*a* of these arms urge the bent up portion 13*b* of the plate member 13 against the resilient force of the leaf spring 17 to bodily move plate member 13 in the rearward direction to disengage head 11 and pinch rollers 12 from the tape during the fast forward and fast rewind operation thus preventing the tape from being damaged.

During this operation, since the elevator frame 1 is held in the raised position, as soon as buttons 7 and 8 are released, the plate member 13 will be restored to the original position to again urge head 11 and pinch rollers 12 against the tape.

To remove the cassette, reset button 19 is depressed to move the elevator frame control member 18 rearwardly against the force of springs 23. Then blocks 20 and 21 which have raised pins 24 and 25, are also moved rearwardly to permit the elevator frame 1 to descend under its own weight. As soon as the heads 26*a* of stop pins 26 leave the bottom surface of guide grooves 28, latch members 29 will be quickly moved in the forward direction by springs 30 to project cassette 32 forwardly by arms 29*a* because reel driving shafts 2 and 3, capstans 4 and 5 and guide shafts have been received in the stationary frame 9 by the downward movement of elevator frame 1.

Since the plate member 13 is moved rearwardly by being pushed by lever 16 which is moved rearwardly together with the elevator frame control member 18, head 11 and pinch rollers 12 will be moved rearwardly concurrently with the rearward movement of the elevator frame 1 so that the head and pinch rollers are held in the retracted position until the elevator frame is raised next time.

Thus, this invention provides a novel tape recorder wherein, upon loading a cassette to a predetermined position, a mechanism required for feeding a tape and including reel driving shafts, capstans, guide shafts and the like, is raised to engage the reel and tape in the cassette while at the same time a magnetic head and pinch rollers are advanced forwardly to engage the tape so that various component parts are maintained in position without any fear of damaging the tape. Further, the tape recorder is simple in construction and can decrease the chance of errors.

While the invention has been shown and described in terms of a preferred embodiment thereof, it should be understood that various changes and modifications will occur to one skilled in the art without departing from the scope of the invention as defined in the appended claims.

1. A magnetic sound recording and reproducing apparatus for loading a cassette having a magnetic tape therein and for removing the cassette therefrom, said apparatus comprising a stationary frame having opposite upper and lower surfaces, a pair of spaced cassette guides mounted on the upper surface of said stationary frame for horizontally guiding said cassette in forward and rearward movement and for defining a cassette receiving chamber, a pair of vertical shafts secured to the lower surface of said stationary frame, an elevator frame movable in a vertical direction towards and away from said stationary frame along said shafts, said elevator frame including a pair of reel driving shafts for driving reels in the cassette, and rotatable drive capstans, said reel driving shafts and drive capstans being located on said elevator frame on the upper surface thereof, a pair of displaceable latch members on the stationary frame having initial positions preventing upward movement of the elevator frame, said latch members being adjacent said receiving chamber and being movable from said initial positions by introduction of a cassette into said receiving chamber, said latch members returning to their initial positions when the cassette is removed, a pair of stop pins mounted on the upper surface of the elevator frame and positioned to face said latch members and be blocked against upward movement when the latch members are in said initial position, said stop pins being released by said latch members when the cassette is loaded in the receiving chamber, camming pins secured to said elevator frame at the bottom thereof, an elevator frame control member supported beneath said elevator frame for horizontal displacement, blocks secured to said frame control member and having inclined surfaces facing said camming pins for controlling movement of said elevator frame in the vertical direction by contact with said camming pins, means urging said elevator frame control member in a direction to bias the inclined surfaces of said blocks against said camming pins and cause the elevator frame to be raised when the latch members have been displaced by full introduction of the cassette into the receiving chamber, a plate member movable in the direction of said capstans, guide means on the upper surface of said stationary frame for guiding said plate member, a magnetic recording and reproducing head on said plate member, a pair of pinch rollers also on said plate member, and means urging said plate member towards said capstans when the cassette is fully introduced in the receiving chamber to cause the head to contact the tape in the cassette, and to cause the pinch rollers to clamp the tape between the capstans and the pinch rollers.

2. Apparatus as claimed in claim 1 comprising a fast rewind and fast forward control coupled to said plate member to move the same away from said capstans to release said head and pinch rollers from said tape, said control including operating arms with bent-up portions, said bent-up portions facing said plate member for engagement therewith when a cassette is fully introduced into said chamber, said operating arms being slidably mounted on the bottom of said elevator frame.